United States Patent [19]

Enga

[11] 4,364,727
[45] Dec. 21, 1982

[54] HEAT TREATMENT OF FOODSTUFF

[75] Inventor: Bernard E. Enga, Maidenhead, England

[73] Assignee: Johnson, Matthey & Co., Limited, London, England

[21] Appl. No.: 249,981

[22] Filed: Apr. 1, 1981

[30] Foreign Application Priority Data

Apr. 1, 1980 [GB] United Kingdom ................. 8010893

[51] Int. Cl.³ ............................................. F27D 17/00
[52] U.S. Cl. .......................................... 432/1; 99/447;
432/29; 432/30
[58] Field of Search .................... 431/328; 432/1, 29, 432/30; 126/39 F; 99/447

[56] References Cited

U.S. PATENT DOCUMENTS

| 3,114,363 | 12/1963 | Koltun | 431/328 |
| 3,193,263 | 7/1965 | Ruff | 431/328 |
| 3,810,732 | 5/1974 | Koch | 431/328 |
| 4,081,958 | 4/1978 | Schelp | 431/328 |
| 4,214,867 | 7/1980 | Hunter et al. | 432/29 |

Primary Examiner—John J. Camby
Attorney, Agent, or Firm—Cushman, Darby & Cushman

[57] ABSTRACT

A method of heat treatment of foodstuff in which a stream of oxygen-containing gas and fuel is passed over one or more catalysts to raise the temperature of the gas stream and the resulting hot, gas stream is contacted with foodstuff in which a proportion of the total fuel may be injected initially and a further proportion or proportions of fuel is subsequently injected preceding passage of the gas and fuel stream over a catalyst and the gas and fuel stream may be passed over catalysts in parallel or in series or so that a portion is continually divided off from the main stream flowing to a main catalyst and passed over a subsidiary catalyst and returned to a point in the mainstream upstream of where it was divided off.

9 Claims, 6 Drawing Figures

HEAT TREATMENT OF FOODSTUFF

This invention relates to a method of heat treatment of foodstuff and in particular to a process in which the foodstuff is for human consumption.

When a carbon containing fuel is burnt by flame combustion the hot gas stream produced unsatisfactorily contains pollutants such as carbon monoxide, hydrocarbons and nitrogen oxides which may be harmful in baking. The gas stream can be heated indirectly by being passed through a heat exchanger in which, for example, heat from the gas produced by the flame combustion of the carbon containing fuel is transferred free of pollutants to the gas stream; however, heat is lost in such a transfer. Direct heating of a gas stream is less expensive because less fuel is used and the heat exchange equipment and associated fans and pumps are not required.

A system for heating a gas stream directly should be capable of working at a reduced throughput compared with the maximum throughput. The 'turndown ratio' is the fraction of full throughput to which the actual throughput can be reduced without loss of continuity. For conventional systems using flame combustion a turndown ratio of 4/5:1 is usual.

It is an object of the present invention to provide a process for the heat treatment of foodstuff particularly for human consumption in which a directly heated gas stream having a low level of pollutants can be employed.

According to a first aspect of the present invention, a process for the heat treatment of foodstuff comprises supplying a stream of oxygen-containing gas and fuel, passing the gas and fuel stream over catalyst to raise the temperature of the gas stream, and contacting the resulting hot gas stream with foodstuff.

According to a second aspect of the present invention a process for the heat treatment of foodstuff material comprises the following steps:
(a) passage of air stream to a mixing chamber;
(b) combining the said stream in the said mixing chamber with a second air stream pre-heated by contact with a pilot burner operating by thermal combustion or an electrical heating element;
(c) injecting into the streams combined at stage (b) a further portion of the total fuel requirement for heating;
(d) passage of the combined streams plus injected fuel through one or more catalytic combustor sections each comprising a temperature stable and oxidation resistant monolith providing catalytic channels for contact with and passage therethrough of the combined fuel-air streams and optionally means for further injection of fuel such that catalytic combustion of substantially the remainder of the uncombusted fuel is initiated;
(e) optionally further dilution of the resulting hot gas stream if necessary to adjust the temperature thereof, and
(f) contacting the said foodstuff material with resulting gas stream.

According to a third aspect of the present invention a process for the heat treatment of foodstuff material comprises the following steps:
(a) passage of an air stream to a first mixing chamber;
(b) combining the said stream in the said mixing chamber with a second air stream preheated by contact with a pilot burner operating by thermal combustion or an electrical heating element;
(c) subdivision of the said combined streams into portions by means of one or more dividers enabling the passage of each portion of the stream through a separate injection and catalytic combustion section;
(d) separately injecting into each portion of the divided stream a further portion of the total fuel requirement for that portion of the stream;
(e) passage of the stream portions plus injected fuel through one or more catalytic combustor sections comprising a temperature stable and oxidation resistant monolith providing catalytic channels for contact with and passage therethrough of the said stream portions plus injected fuel such that catalytic combustion of substantially the remainder of the uncombusted fuel in each portion of the stream is initiated;
(f) recombining the resulting streams from each catalytic combustor section in a second mixing chamber;
(g) optionally further stages (c), (d), (e) and (f) may be repeated one or more times using the remainder of the fuel;
(h) optionally further dilution of the resulting hot gas stream if necessary to adjust the temperature thereof, and
(i) contacting the said foodstuff material with the resulting gas stream.

According to a fourth aspect of the present invention an apparatus for the heat treatment of foodstuff material comprises:
(a) a fan or other means for supplying a stream of air;
(b) a pilot burner, fuelled by a fuel injector, or an electrical heating element operating to pre-heat a stream of oxygen-containing gas;
(c) a mixing chamber for combining the stream of gas pre-heated by the pilot burner or the electrical heating element with the stream of air produced by the fan at stage (a);
(d) an injector system for injecting a further portion of the fuel requirement into the hot gases from chamber (c);
(e) a catalytic combustor section comprising one or more temperature stable and oxidation resistant monoliths, said monoliths providing catalytic channels for contact with and passage therethrough of the air-fuel streams combined with means for further injection of fuel such that catalytic combustion of substantially the remainder of the fuel is initiated;
(f) optionally means for diluting the hot combustion gases from stage (e) and
(g) means for contacting the resulting hot gases with the said foodstuff material.

Preferably the oxygen-containing gas is air. The fuel used may be either gaseous or liquid.

According to a fifth aspect of the present invention a process for the heat treatment of foodstuff material comprises the following steps:
(a) passage of an air stream preheated by contact with a pilot burner operating by thermal combustion or an electrical heating element to a mixing chamber:
(b) injecting into the said stream a further portion of the total fuel requirement for heating;
(c) passage of the stream plus injected fuel through one or more catalytic combustor sections each comprising a temperature stable and oxidation resistant monolith providing catalytic channels for contact with and passage therethrough of the combined fuel-air streams such that catalytic combustion of substantially the remainder of the uncombusted fuel is initiated;

(d) optionally further dilution of the resulting hot gas stream if necessary to adjust the temperature thereof;

(e) optionally further stages (b), (c) and (e) may be repeated one or more times using the remainder of the fuel, and (f) contacting the said foodstuff material with the resulting gas stream.

By using the method according to the invention it is possible to directly heat a gas stream and to obtain a gas stream having a low pollutant content. Also, direct heating is less expensive than indirect heating since less fuel is used, because heat production is efficient, and additional rquiement such as a heat exchanger is not needed.

Several embodiments of the present invention will now be described by way of example and with reference to the accompanying drawings, in which.

Figure 1:
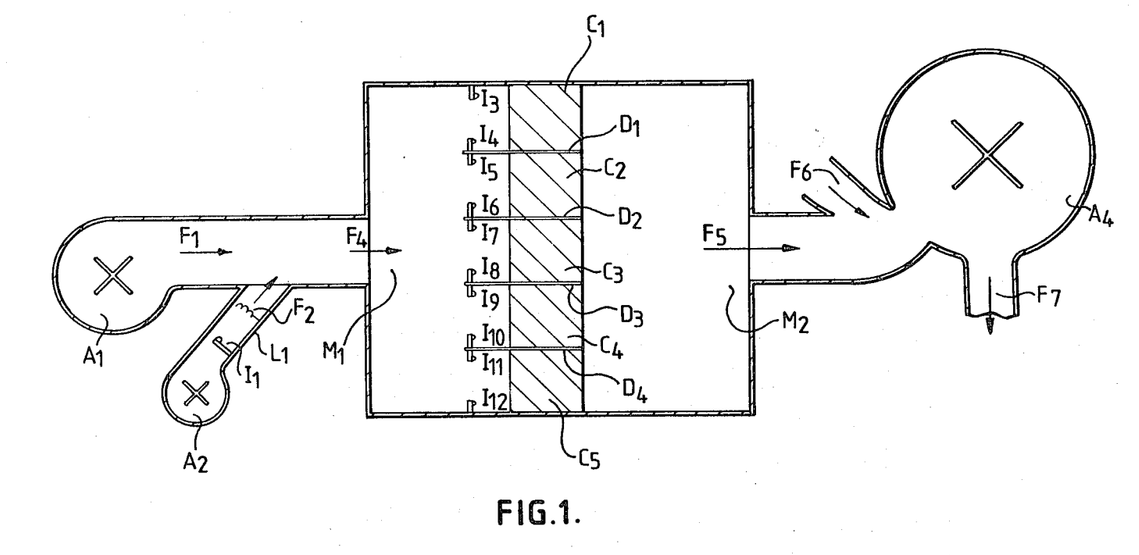
FIG. 1 is a schematic diagram of a first embodiment according to the invention.

A first embodiment is illustrated in FIG. 1. A fan $A_1$ supplies a stream of air or other oxygen-containing gas, $F_1$ which is mixed with a pre-heated stream of oxygen-containing gas e.g. air $F_2$ to form a stream of heated gas $F_4$ at a temperature of 50°–500° C. A fan $A_2$ and an igniter $L_1$, fuelled by a fuel injector $I_1$, comprising a pilot burner, supplies the second stream $F_2$. In a mixing chamber $M_1$, a set of four dividers $D_1$–$D_4$ separate $F_4$ into five streams and ten injectors $I_3$–$I_{12}$, two in each stream inject the remaining fuel avaialble to the system. A supported catalyst is similarly divided into five sections $C_1$–$C_5$, each section being fed with each air stream plus fuel supplied by the two respective injectors e.g. $C_1$ is supplied by $I_3$ and $I_4$, and $C_3$ by $I_7$ and $I_8$. The hot streams of air from each catalyst section are recombined into a stream $F_5$ which flows out of the chamber. $F_5$ is diluted if necessary with a stream of air $F_6$ from fan $A_4$ to produce a final stream of air $F_7$ at the temperature required.

Figure 2:
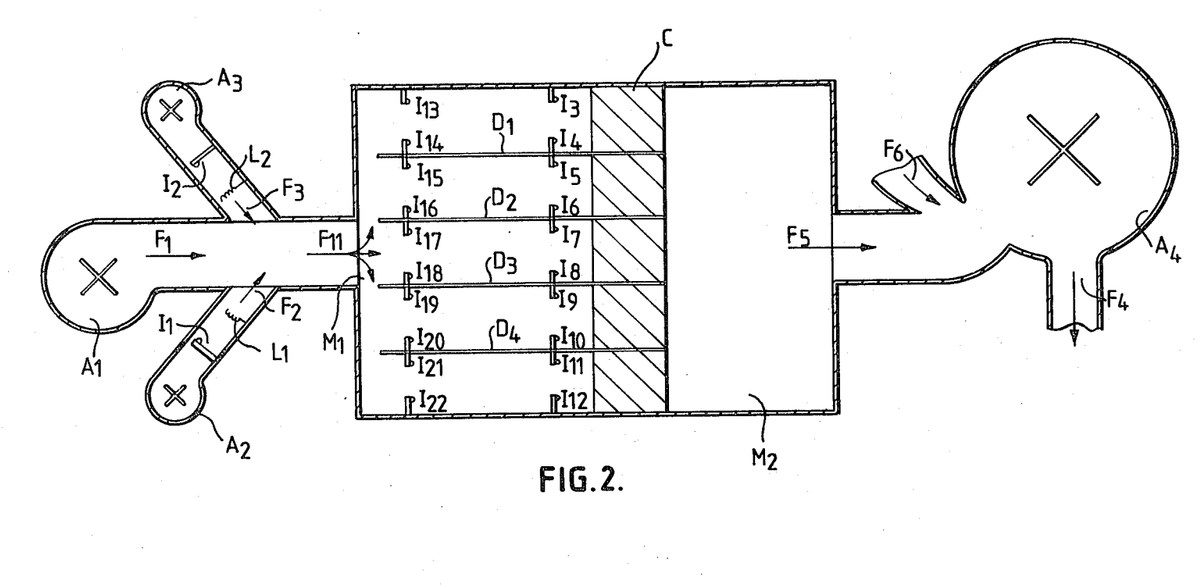
FIG. 2 is a schematic diagram of a second embodiment according to the invention.

A second embodiment is shown in FIG. 2, which is a modification of the first embodiment, operating on two fuel sources so that if for some reason there is a shortage of one fuel, the second fuel can be used without stopping the process. A second pilot burner comprising an igniter $L_2$ fuelled by a fuel injector $I_2$ is supplied with air by a fan $A_3$. In the mixing chamber $M_1$ there are ten further fuel injectors $I_{13}$–$I_{22}$ located upstream of the injectors $I_3$–$I_{12}$. The first fuel may be a gas, such as natural gas, and the second fuel may be a liquid fuel.

As before, in the mixing chamber four dividers $D_1$–$D_4$ divide the air stream $F_4$ into 5 separate streams and four injectors, two for each fuel, inject the remaining fuel available into each stream.

The catalyst may be whole or segmented as shown in FIG. 2. With more than one combustion section the total quantity of fuel supplied can be adjusted. One or more of the catalysts need not be used and the temperature of the gas stream can therefore be varied.

Figure 3:
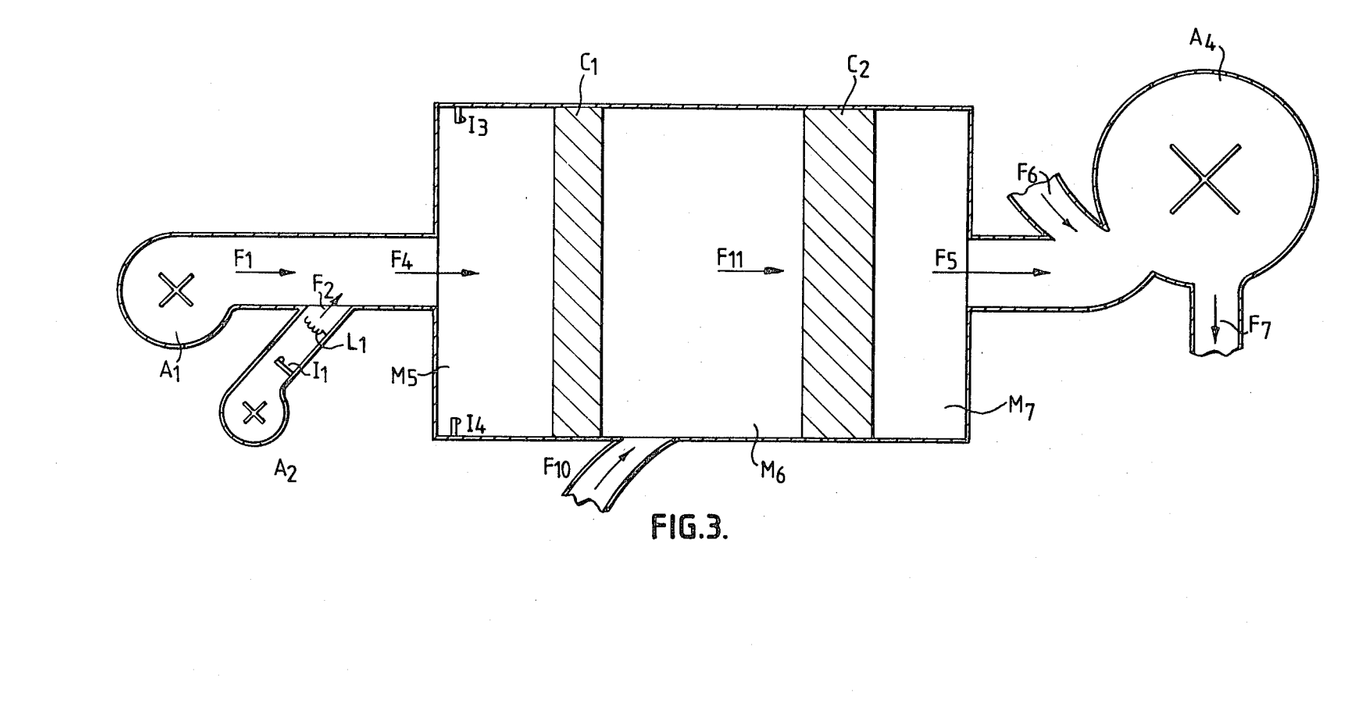
FIG. 3 is a schematic diagram of a third embodiment according to the invention.

A third embodiment is shown in FIG. 3. A supply of air $F_1$ provided by a fan $A_1$ is mixed with a pre-heated stream of air heated by an igniter burner $L_1$, fuelled by a fuel injector $I_1$ to form a stream of air $F_4$ in a mixing chamber $M_5$. The remainder of the fuel is injected by fuel injectors $I_3$ and $I_4$ before the gas stream flows through a catalyst $C_1$. After flowing through $C_1$ into a mixing chamber $M_6$, a further supply of air $F_{10}$ is mixed with the gas stream to form a stream of gas $F_{11}$ which flows through a second catalyst $C_2$. The resulting hot gas stream $F_5$ is mixed in a mixing chamber $M_7$ as required with a further stream of air $F_6$ by a fan $A_4$ to produce a final gas stream $F_7$.

The gas stream $F_4$ should not contain sufficient oxygen for the complete combustion of the fuel when it passes over the first catalyst $C_1$. The gas stream $F_{11}$ flowing over the second catalyst $C_2$, however, has an excess of oxygen present due to the addition of the air, $F_{10}$. The gas stream $F_4$ passing over the first catalyst should only contain 35–65% of the oxygen required for complete combustion of the fuel present.

This apparatus can be used with fuels containing bound nitrogen; such fuels on burning normally form exhaust gases containing nitrogen oxides. By using catalytic combustion the amount of nitrogen oxides in the exhaust gas is considerably reduced.

In the three embodiments described, the pilot burner consists essentially of a fuel injector and an ignitor. The burner can be placed directly in the main gas stream $F_1$ so that a proportion of this stream passes through the burner.

The amount of fuel supplied to the pilot burner is between 0.01–15% volume by evaporate and preferably 0.01–10% of the total fuel available. The temperature of the gas stream flowing into the combustion chamber, that is the inlet temperature of the gas flowing through the catalyst, is controlled by adjusting the fuel supply to the pilot burner. During the initial period of operation the inlet temperature is 200°–500° C., depending on the fuel used. Once combustion of the fuel over the catalyst has started the inlet temperature can be lowered to between 50° and 250° C. by reducing the amount of fuel supplied to the pilot burner.

The gas stream flowing over the catalyst, in the first and second embodiments, and over the second catalyst in the third embodiment should have an excess of air for the complete combustion of the fuel present. The percentage of fuel present in a gas stream containing air and fuel is 0.01–20% volume by evaporate and preferably between 0.01–10% of the total fuel available. The concentration of a gaseous fuel should be below the lower inflamability limit.

Figure 4:
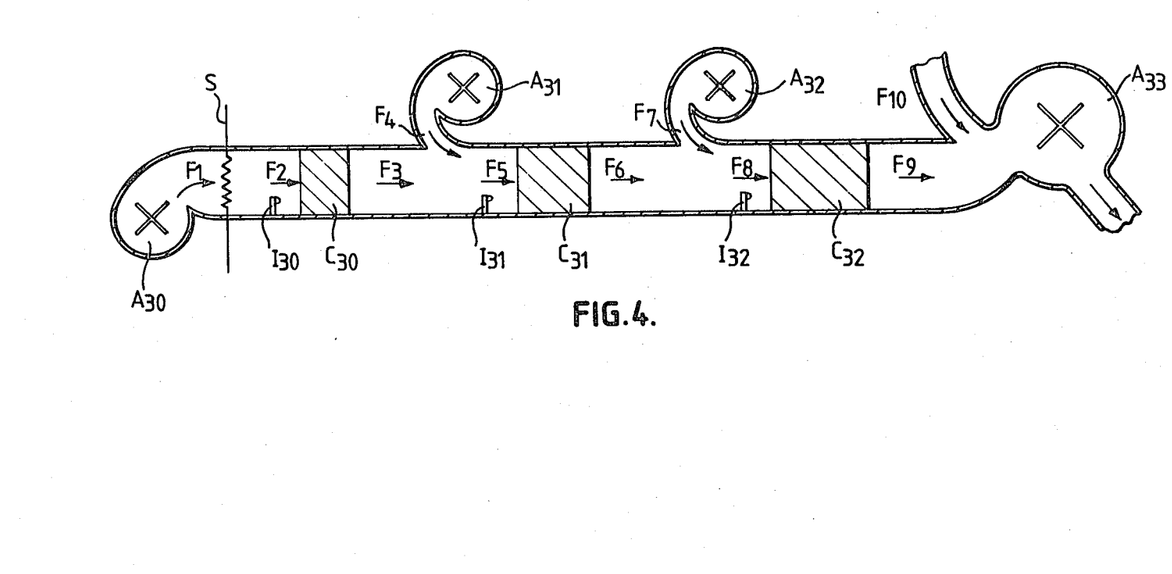
FIG. 4 is a schematic diagram of a fourth embodiment according to the invention.

A fourth embodiment of the invention is shown in FIG. 4. A fan $A_{30}$ supplies a stream of air $F_1$ which passes over an electrical heater S raising the temperature of the air to 200°–500° C. A proportion of the total fuel available to the system, 0.1–10%, is added to the stream of air $F_2$ by a fuel injector $I_{30}$ before the air stream $F_2$ passes through a catalyst $C_{30}$. The temperature of the stream of air $F_3$ leaving the catalyst $C_{30}$ is between 500° C. and 1200° C. A stream of air $F_4$ from a second fan $A_{31}$ is mixed with the air stream $F_3$ to form a stream of air $F_5$ at a temperature of 200°–500° C. and a further proportion of the fuel is then added from injector $I_{31}$.

The stream of air $F_5$ then passes over a catalyst $C_{31}$. The stream of air $F_6$ leaves the catalyst $C_{31}$ at a temperature 500°–1200° C. and is mixed with another stream of air $F_7$ from a third fan $A_{32}$ to form an air stream $F_8$ at 200°–500° C. The remainder of the total fuel available is added by a fuel injector $I_{32}$ before the air stream $F_8$ passes through a catalyst $C_{32}$. The stream of air $F_9$ resulting at 500°–1200° C. from the catalyst $C_{32}$ is mixed with an air stream $F_{10}$ from a fourth fan $A_{33}$ to produce a final stream of air $F_{11}$.

Thus, the stream of air containing a proportion of fuel, should be at a temperature of 200°–500° as it flows through each catalyst. The temperature of the gas stream as it leaves each catalyst is increased and lies in the range 500°–1200° C. and a further stream of air, at a lower temperature, supplied by a fan or similar is added and the temperature of the resulting stream of air is 200°–500° C. A proportion of fuel is injected into the stream of air prior to its passage through each catalyst. The number of catalysts and associated fans and fuel injectors may be two or more.

Each successive catalyst, downstream of the first catalyst, is larger than the previous catalyst and the amount of fuel injected before each catalyst is increased with the size of each said successive catalyst.

Only one fan need be used for the exiting streams of air, being separated into a number of air streams and conveyed to the required areas by tubes or ducts.

To commence operation, air from the fan $A_{30}$ is heated by the heater S to about 400° C. before any fuel is added via the fuel injector $I_{30}$. Once the first catalyst $C_{30}$ has been passed, the other catalysts (31 and 32) may be successively brought into operation. To decrease the output, the fuel supply to the last catalyst $C_{32}$ and the fan associated with that catalyst are stopped and to further decrease the output, the fuel supply to the catalysts $C_{30}$ and $C_{31}$ is turned off, $C_{31}$ first.

Figure 5:
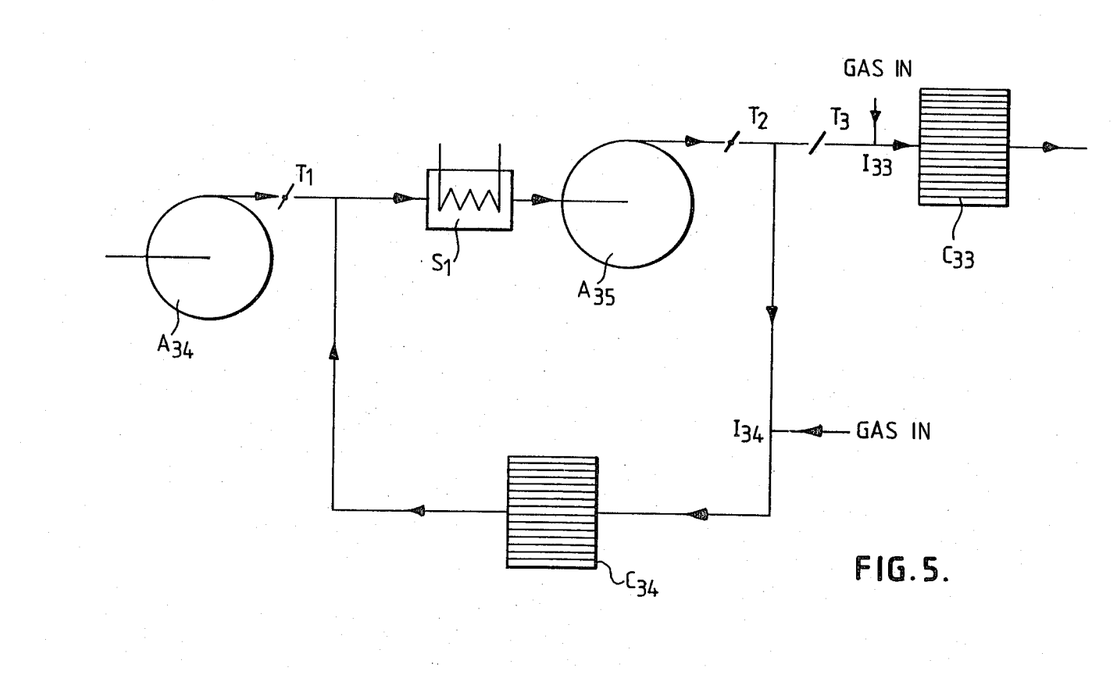
FIG. 5 is a flow diagram of a fifth embodiment according to the invention.
Figure 6:
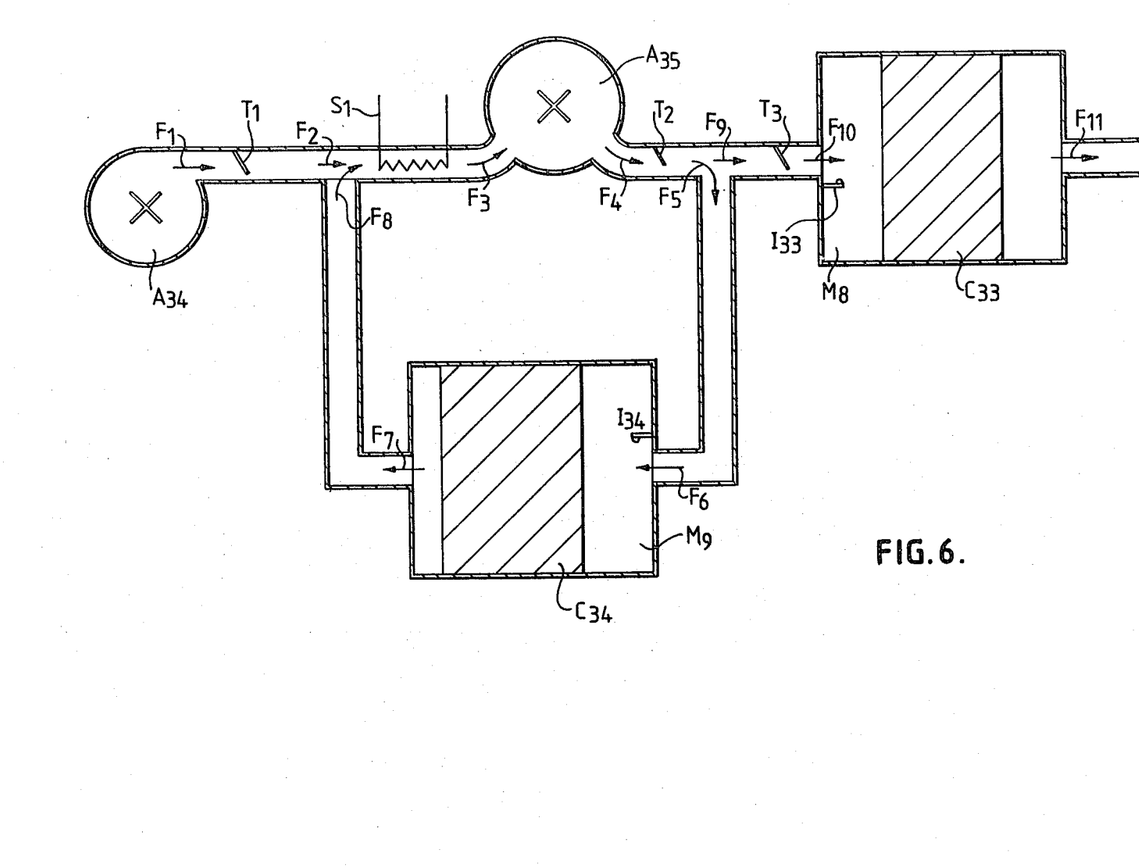
FIG. 6 is a schematic diagram of the fifth embodiment according to the invention.

A fifth embodiment of the invention will be described with reference to FIGS. 5 and 6. A stream of air $F_1$ produced by a fan $A_{34}$, or similar apparatus, is passed over an electrical heater $S_1$ and the resulting stream $F_2$ is passed through another fan $A_{35}$. The stream of air $F_4$ may be divided into two streams $F_5$ and $F_9$. The stream of air $F_9$ flows into a mixing chamber $M_8$ where fuel from an injector $I_{33}$ is added to air stream $F_{10}$ before this contacts a supported catalyst $C_{33}$ and finally emerges as a heated stream of air $F_{11}$ for contact with foodstuff.

The electrical heater $S_1$ heats the stream of air $F_2$ to 200°–600° C. which is above the light-off temperature of the catalysts. The second stream of air $F_5$ is recirculated via the mixing chamber $M_9$ and heated by the combustion of fuel from injector $I_{34}$ over the catalyst $C_{34}$. The heated air stream $F_7$ at a temperature of 550°–1000° C. then passes back into the main air stream $F_2$. The electricity supply to $S_1$ can be reduced or switched off as desired since the subsidiary catalyst $C_{34}$ is used to heat the stream of air for the main catalyst $C_{33}$. A ratio-regulation controller is used to adjust the flow of air and the injection of fuel into the apparatus using valves $T_1$, $T_2$ and $T_3$.

The sizes of the catalysts, heater and fans will be dependent on the required output of the system. Turndown of the system is affected by reducing both the quantity of fuel injected into and the amount of air in the air stream $F_{10}$ by the injector $I_{33}$. A turndown ratio of 15:1 can be achieved during general running and a ratio 20:1 during start-up. The space velocity of the gas flowing through the catalyst i.e. the total volume of gas flowing per hour/volume of chamber can be up to 60,000 $hr^{-1}$.

In all the embodiments the velocity of the gas stream flowing through the combustion chamber depends on the fuel but it must be greater than the flame propagation velocity to prevent the risk of flame spreading.

The catalysts are each supported on a metallic or ceramic substrate with an intermediate layer (the "washcoat") of a refractory metal oxide which covers at least part of the substrate. The substrate is preferably a monolith i.e. a unitary body with channels running through it in the direction of gas flow; a structure of knitted or woven wire may be used as the substrate. Metals or alloys used in the fabrication of the substrate should be oxidation resistant and thermally stable up to at least 1000° C. at high temperature zones.

The temperatures of the resulting gas streams will depend on the nature of the fuel and the catalyst, the deactivation temperature of the catalyst, the temperature stability of the support material and other factors.

Suitable base metal alloys are Ni and Cr alloys, having an aggregate nickel plus chromium greater than 20% by weight of the total weight, and alloys of iron, including at least one of the elements in % by weight 3–40% Cr, 1–10% Al, trace-5% Co, trace-72% Ni and trace-0.5% carbon. Such substrates are described in German DOS No. 2450664 published Apr. 30, 1975.

Other examples of base metal alloys capable of withstanding the rigorous conditions required are iron-aluminium-chromium alloys, which may also contain yttrium. These latter alloys may contain in weight % 0.5–12% Al, 0.1–3.0% Y, 0.20% Cr and balance Fe; these are described in U.S. Pat. No. 3,298,826. Another range of Fe-Cr-Al-Y alloys contain by weight % 0.5–4% Al, 0.5–3.0% Y, 20.0–95% Cr and balance Fe and these are described in U.S. Pat. No. 3,027,252.

Alternatively, the base metal alloys may have low corrosion resistance e.g., mild steel and a protective coating composition covering the surface of the substrate is employed as described in British patent application No. GB 2,013,517A published on Aug. 5, 1979.

Suitable ceramic materials for use as the substrate are mullite, zircon, mullite, cordierite, silicon carbide, silicon nitride and zirconia. The material must have sufficient thermal shock resistance to withstand being heated from room temperature to 1000° C. for at least a period of 30 seconds.

The washcoat layer preferably contains, in oxide form, one or more of Mg, Ca, Sr, Ba, Si, Y, the lanthanides, Ti, Zr, Hf, Th, V, Cr, Mn, Co, Ni, B, Al, Si and Sn. Preferred washcoat material is $Al_2O_3$ or alumina hydrates but stabilising oxides such as barium oxide and oxides promoting catalytic activity such as $TiO_2$, $ZrO_2$, $HfO_2$, $ThO_2$, $Cr_2O_3$ and NiO may also be present. The preferred washcoat loading is between 0.006 and 0.1 g $cm^{-3}$ monolith.

The catalytic metal is selected from Rh, Pd, Ir, Pt, Os, Cu, Co, Ni, W and the lanthanides and mixtures, alloys and intermetallic compounds of these metals disposed upon the surface of or throughout the refractory metal oxide layer. The preferred metals are Ce, Ni, Ba, Co and W. The loading of the catalytic metal is between 700 and 8,800 $gm^{-3}$ monolith.

It will be appreciated that other combustible gases will be suitable for use, instead of natural gas, such as propane or butane.

The following example shows the effectiveness of heating a gas stream directly according to the invention. In a test rig, a stream of air was heated to between 200°–600° C. by an electrical heater. Natural gas was injected into the air stream and the resulting gaseous stream was mixed in a mixing chamber before passing through a first catalyst and a second catalyst. The temperature of the gaseous stream before and after the catalysts was measured. The concentration of natural gas, nitrogen oxides and carbon monoxide was measured in the outlet gaseous stream from the catalysts.

The catalysts used were supported in a 62 cell cm$^{-2}$ metallic monolith fabricated from FeCr alloy having a diameter of 48 mm and a length of 50.8 mm. The support was coated with a washcoat of alumina containing barium dried and fired at 950° C. for 1 hour. The washcoated support was impregnated with a solution containing cerium and a solution containing platinum or platinum and palladium, dried and fired at 950° C. for 1 hour. The washcoat loading was 0.12 g cm$^{-3}$ and the total platinum group metal loading was 4260 gm$^{-3}$ with a palladium to platinum ratio of 3:1.

The proportion of natural gas used was 2% of the air stream. The effect of inlet temperature on the conversion of methane was studied. To produce a heated air stream containing little or no pollutants the conversion of methane should be at least 99%. The results of the tests were as follows:

| (I) | Catalyst: | Platinum |
|---|---|---|
| | Conversion of natural gas | 99.8% i.e. > 99% |
| | Inlet temperature | 540° C. |
| | Outlet temperature | 900–950° C. |
| | Outlet gas contained | NOx < 1 ppm |
| | | CO < 100 ppm |
| (II) | Catalyst: | Platinum/ Palladium |
| | Conversion of natural gas | 99.8% i.e. > 99% |
| | Inlet temperature | 500° C. |
| | Outlet temperature | 900–950° C. |
| | Outlet gas contained | NOx < 1 ppm |
| | | CO < 100 ppm |

It will thus be seen that according to the present invention a hot gas stream is produced which has very low pollutant content and which is therefore suitable for use in the heat treatment of foodstuff i.e. in baking and the like. Also, the method according to the invention has a much improved turndown ratio over conventional systems.

I claim:

1. A method for the heat treatment of a foodstuff using apparatus comprising a pilot burner or electrical heating element and a catalytic combustor composed of a catalyst supported on a temperature stable and oxidation resistant monolith coated with a refractory oxide layer which comprises:
   (a) preheating an oxygen-containing gas stream by means of said pilot burner or electrical heating element;
   (b) combining a second oxygen-containing gas stream with the preheated oxygen-containing gas stream in a mixing zone;
   (c) injecting fuel into the mixture of gas streams combined at (b);
   (d) passing the mixture of gas streams and injected fuel from (c) through the catalytic combustor such that catalytic combustion of the fuel is initiated; and
   (e) contacting the foodstuff with the gas stream resulting from (d).

2. A method according to claim 1 wherein stages (c) and (d) are repeated at least once.

3. A method according to claim 1 wherein the gas stream from stage (d) is combined with a third oxygen-containing gas stream and the gas streams and fuel are passed over a second catalytic combustor.

4. A method according to claim 3 wherein further stages (c), (d), (e) and (f) are repeated at least once.

5. A method according to claim 1 wherein the oxygen-containing gas is supplied via a fan.

6. A method according to claim 1 wherein the hot gas resulting from passage of the mixture of gas stream and injected fuel through a catalytic combustion in (d) is diluted by an oxygen-containing gas stream at a lower temperature before (e).

7. A method according to claim 1 wherein the system has a turndown ratio in the range 15–20:1.

8. A method according to claim 1 wherein the gas stream resulting from stage (d) is mixed with an additional oxygen-containing gas stream and passed through a further catalytic combustor prior to contacting the foodstuff with the gas stream in (e).

9. A method for the heat treatment of foodstuff using apparatus comprising a pilot burner or electrical heating element and a catalytic combustor section including at least one catalytic combustor composed of a catalyst supported on a temperature stable and oxidation resistant monolith coated with a refractory oxide layer which comprises:
   (a) preheating an oxygen-containing gas stream by means of said pilot burner or electrical heating element;
   (b) combining a second oxygen-containing gas stream with the preheated oxygen-containing gas stream from (a) in a mixing zone;
   (c) subdividing the gas streams combined in (b) into gas portions which can be separately passed in parallel into said catalytic combustor section;
   (d) injecting fuel into one or more of said gas portions obtained by subdividing in (c);
   (e) injecting fuel into one or more of said gas portions obtained by subdividing in (c);
   (e) passing said portions of the subdivided stream and the injected fuel through one or more of said catalytic combustors in parallel such that catalytic combustion of the fuel is initiated;
   (f) recombining the portions of the subdivided stream in (e) in a second mixing zone; and
   (g) contacting the foodstuff with the recombined gas stream obtained in (f).

* * * * *